United States Patent [19]

Yasuda et al.

[11] Patent Number: 4,558,178
[45] Date of Patent: Dec. 10, 1985

[54] WIRELESS TELEPHONE APPARATUS INCLUDING BOTH A TELEPHONE HANDSET AND A TELEPHONE HEADSET

[75] Inventors: Hiroshi Yasuda, Hino; Kuniyoshi Marui, Tokarozawa, both of Japan

[73] Assignee: Tokyo Shibaura Denki Kabushiki Kaisha, Kawasaki, Japan

[21] Appl. No.: 568,269

[22] Filed: Jan. 4, 1984

[30] Foreign Application Priority Data

Jun. 27, 1983 [JP] Japan .................. 58-115408

[51] Int. Cl.⁴ .................. H04Q 7/04; H04M 1/00
[52] U.S. Cl. .................. 179/2 E; 179/2 EA; 179/2 EB; 179/81 B; 179/156 A
[58] Field of Search .................. 179/2 E–2 EC, 179/81 R, 81 B, 100 L, 100 R, 156 R, 156 A, 160–166

[56] References Cited

U.S. PATENT DOCUMENTS

| | | | |
|---|---|---|---|
| 2,877,302 | 3/1959 | Radomski et al. | 179/81 B |
| 3,833,766 | 9/1974 | Eklof et al. | 179/81 B |
| 4,400,584 | 8/1983 | Vilmur | 179/81 B X |
| 4,493,950 | 1/1985 | Lott | 179/81 B |

Primary Examiner—Gene Z. Rubinson
Assistant Examiner—W. J. Brady
Attorney, Agent, or Firm—Banner, Birch, McKie & Beckett

[57] ABSTRACT

A wireless telephone apparatus is disclosed which includes an acoustic transmission apparatus employing a telephone handset for use during a normal telephone conversation mode and a telephone headset for use during a hands-free telephone conversation mode. No speaker and microphone are used during the hands-free telephone conversation mode. The acoustic transmission apparatus includes a control section which normally connects the telephone handset to the wireless telephone apparatus, but is responsive to the operation of a selector or headset switch to connect the telephone headset without interrupting the telephone conversation. Similarly, the control section enables the user to switch back to using the telephone handset without interrupting the telephone conversation. A visual display is provided to indicate whether the telephone handset or the telephone headset is connected to the wireless telephone apparatus.

9 Claims, 10 Drawing Figures

WIRELESS TELEPHONE APPARATUS INCLUDING BOTH A TELEPHONE HANDSET AND A TELEPHONE HEADSET

BACKGROUND OF THE INVENTION

This invention relates to wireless telephone apparatus capable of sending and receiving telephone calls from an automobile or any other vehicle which is capable of moving within a designated service area.

A conventional wireless telephone system, such as shown in FIG. 1, includes wireless telephone apparatus 1 which communicates by radio signals with base station 2. Base station 2 is connected by land lines to telephone exchange 3. This system is capable of connecting telephone calls between two wireless telephones 1 or wireless telephone 1 and ordinary telephone 4. A plurality of frequency channels are used in communicating between wireless telephone 1 and base station 2, at least one of which is allocated to control and the remainder allocated to operations, i.e., telephone conversations. A telephone conversation is established on an available operating channel by initiating communication on the control channel and exchanging control information, and then switching to the operating channel.

FIG. 2 is a block diagram of a conventional wireless telephone apparatus including an acoustic transmission apparatus, hook switch 21 and radio signal control section 19. The acoustic transmission apparatus includes telephone handset 10, microphone 11, speaker 12, first switch 13, second switch 14, voice control circuit 15, sidetone circuit 16, receiving line 17, transmitting line 18, control keys 20 and control section 22.

Telephone handset 10, which is used during normal conversation, receives an audio signal from radio signal control section 19 via receiving line 17, second switch 14 and sidetone circuit 16. An audio signal is transmitted by telephone handset 10 to radio signal control section 19 via sidetone circuit 16, first switch 13 and transmitting line 18. When handsfree conversation is desired, microphone 11 and speaker 12 are used. Microphone 11 transmits an audio signal to radio signal control section 19 via voice control circuit 15, first switch 16 and transmitting line 18. Speaker 12 receives an audio signal from radio signal control section 19 via receiving line 17, second switch 14 and voice control circuit 15. First switch 13 and second switch 14, which may be relay switches or transmitter switches, connect receiving line 17 and transmitting line 18 with sidetone circuit 16 or voice control 15 in accordance with a select signal generated by control section 22.

Voice control circuit 15 automatically controls speaker volume in accordance with the level of the audio signal detected by microphone 11. As the sound increases during a hands-free conversation, the sound emanating from speaker 12 decreases in volume. Sidetone circuit 16 adjusts gain in order to present a sidetone. Control keys 20 include 12 dailing or digit keys, SEND key, END key and CHANGE key. The SEND key is used to initiate a call and the CHANGE key is used to select either a handset conversation or a hands-free conversation. Control section 22 controls the switching operation of first switch 13 and second switch 14 in accordance with the operation of the CHANGE key, and in accordance with control data from radio signal control section 19. Control section 22 also transmits various key data from control key 20 to radio signal control section 19 via a data bus.

Radio signal control section 19 controls communication between the wireless telephone apparatus and a remote base station. This radio signal control section 19 receives audio signals from handset 10 or microphone 11, and modulates the radio frequency signal which is transmitted to base station 2. Radio signal control section 19 also receives incoming modulated radio frequency signals via an antenna and demodulates these signals to generate either a control signal or an audio signal which is sent over receiving line 17.

When a telephone call is initiated with this wireless telephone apparatus, the user first operates the 12 dialing or digit keys of control keys 20 and then operates the SEND key. The call origination signal and the dialing signal originated by the wireless telephone apparatus are transmitted by radio signal control section 19 to base station 2 over a control channel and, according to a command signal transmitted from base station 2, radio signal control section 19 enables the wireless telephone apparatus to transmit over an available operating channel. Thereafter, a telephone conversation is established between the wireless telephone apparatus and a remote telephone via base station 2.

In the conventional wireless telephone apparatus, the telephone conversation can take place over handset 10 or speaker phone 10-11, depending on the operation of the CHANGE key. If first switch 13 and second switch 14 connect receiving line 17 and transmitting line 18 with sidetone circuit 16 in accordance with the operation of the CHANGE key, then handset 10 is used. If first switch 13 and second switch 14 connect receiving line 17 and transmitting line 18 with voice control circuit 15 in accordance with the operation of the CHANGE key, then microphone 11 and speaker 12 are used.

If the wireless telephone apparatus is called by another telephone, base station 2 transmits a call receipt signal, together with the appropriate available operating frequency channel, over a control channel. Upon receipt of the call receipt signal and information concerning the available operating channel, radio signal control section 19 enables the wireless telephone apparatus to communicate over the assigned operating channel. Moreover, in the state of standby, first switch 13 and second switch 14 connect receiving line 17 and transmitting line 18 with voice control circuit 15 in accordance with a control signal from control section 22. Control section 22 generates the control signal in accordance with control data received from radio signal control section 19 via the data bus. Then, if the wireless telephone apparatus is called by another telephone when it is in the standby condition, radio signal control section 19 generates an alert signal. This alert signal is generated until the user of this wireless telephone apparatus operates either the SEND key or hook switch 21, or until radio signal control section 19 receives a clearing signal from base station 2. The alert signal is transmitted by radio signal control section 19 to speaker 12 via receiving line 17, second switch 14 and voice control circuit 15 to ring speaker 12.

The above described wireless telephone apparatus has a number of disadvantages. In the hands-free conversation mode, when a microphone and speaker are used, an expensive and complicated voice control circuit, which includes an automatic speaker volume control device responsive to the level of the audio signal detected by the microphone, is required. Also, in the hands-free conversation mode, the user cannot engage in a private conversation because a microphone must be used. Furthermore, as ambient sound increases during the hands-free conversation mode, the sound from the speaker decreases in volume so that the telephone conversation is difficult to hear.

SUMMARY OF THE INVENTION

It is an object of the present invention to provide an acoustic transmission apparatus for a wireless telephone apparatus which enables the user to conduct private conversations during the hands-free conversation mode. Another object of this invention is to provide an acoustic transmission apparatus for a wireless telephone apparatus which eliminates the expensive and complicated voice control circuit previously required by conventional wireless telephone apparatus during the hands-free conversation mode.

A further object of the present invention is to provide such an acoustic transmission apparatus for a wireless telephone apparatus which enables the user to easily converse during the hands-free conversation mode. It is a further object of this invention to provide an acoustic transmission apparatus which employs an alternate mechanism to the conventional microphone and speaker for use during the hands-free conversation mode.

According to the present invention, and in order to realize the above objects, an acoustic transmission apparatus for a wireless telephone apparatus is provided which employs a telephone headset instead of a speaker and microphone for use during the hands-free conversation mode. The acoustic transmission apparatus includes both a telephone handset and a telephone headset, the latter of which can be selected by operating a headset or selector switch. During normal operation, a control section in the acoustic transmission apparatus connects the telephone handset to transmitting and receiving lines which transmit and receive audio signals to and from a radio signal control section of the wireless telephone apparatus. In the event the user decides to use the telephone headset instead of the telephone handset, the headset switch is operated and the control section automatically connects the telephone headset to the transmitting and receiving lines without interrupting the telephone conversation. Similarly, the control section enables the user to switch back to using the telephone handset without interrupting the telephone conversation by simply picking up the telephone handset. A visual display is provided to indicate whether the telephone handset or the telephone headset is connected to the transmitting and receiving lines.

DETAILED DESCRIPTION OF THE PREFERRED EMBODIMENTS

Figure 1:
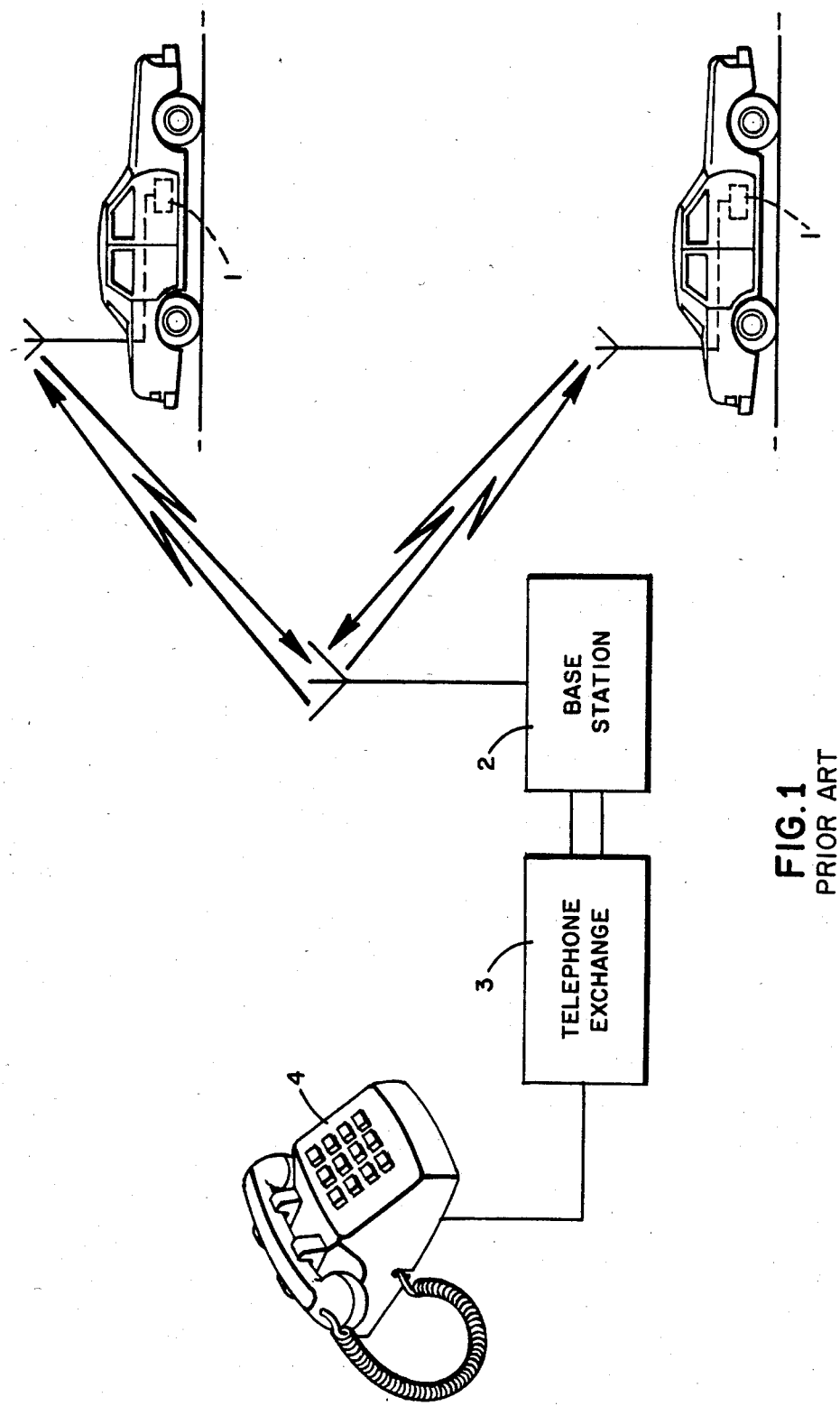
FIG. 1 is a block diagram of the major features of a conventional wireless telephone system.
Figure 2:
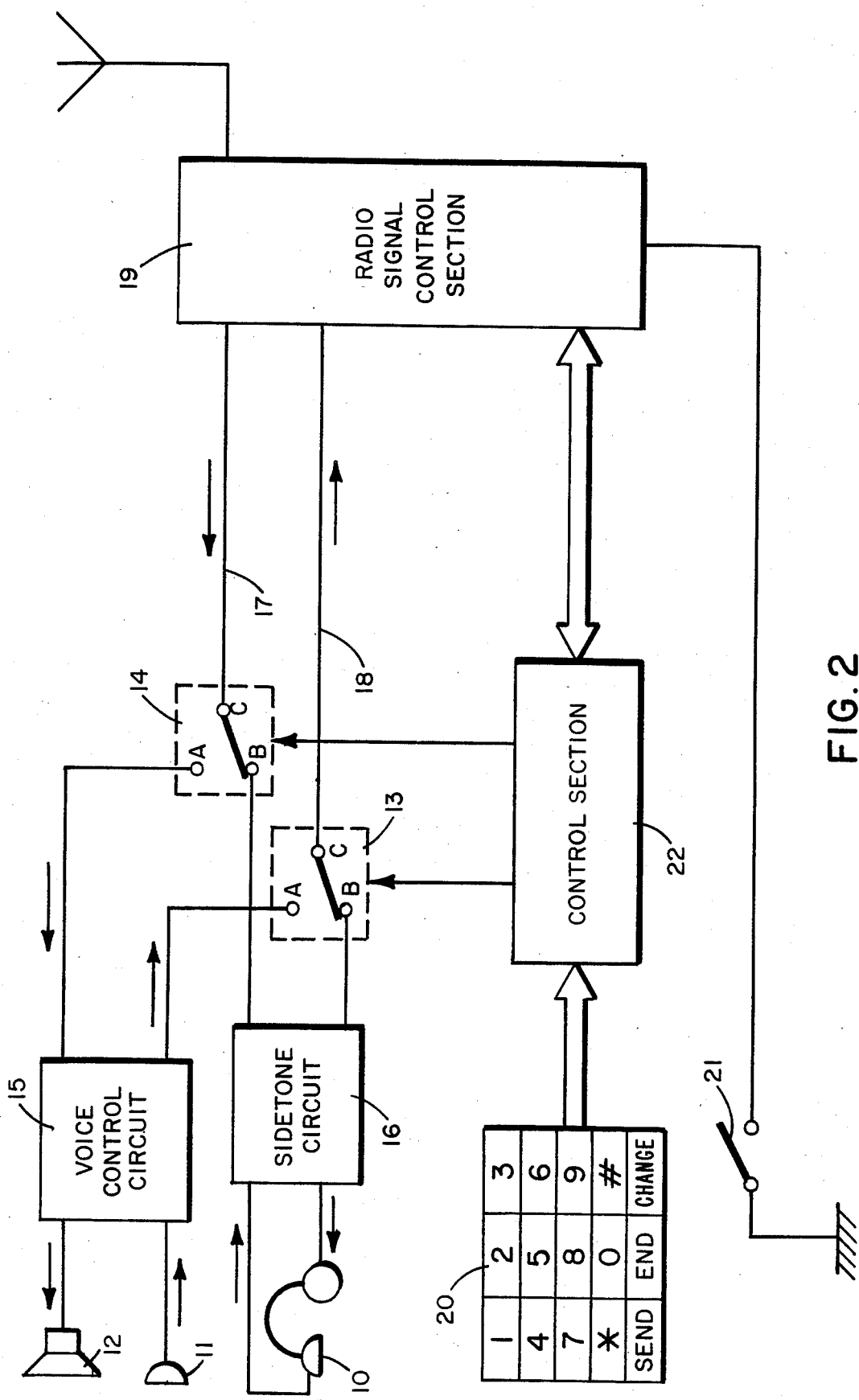
FIG. 2 is a block diagram of a conventional wireless telephone apparatus.
Figure 3:
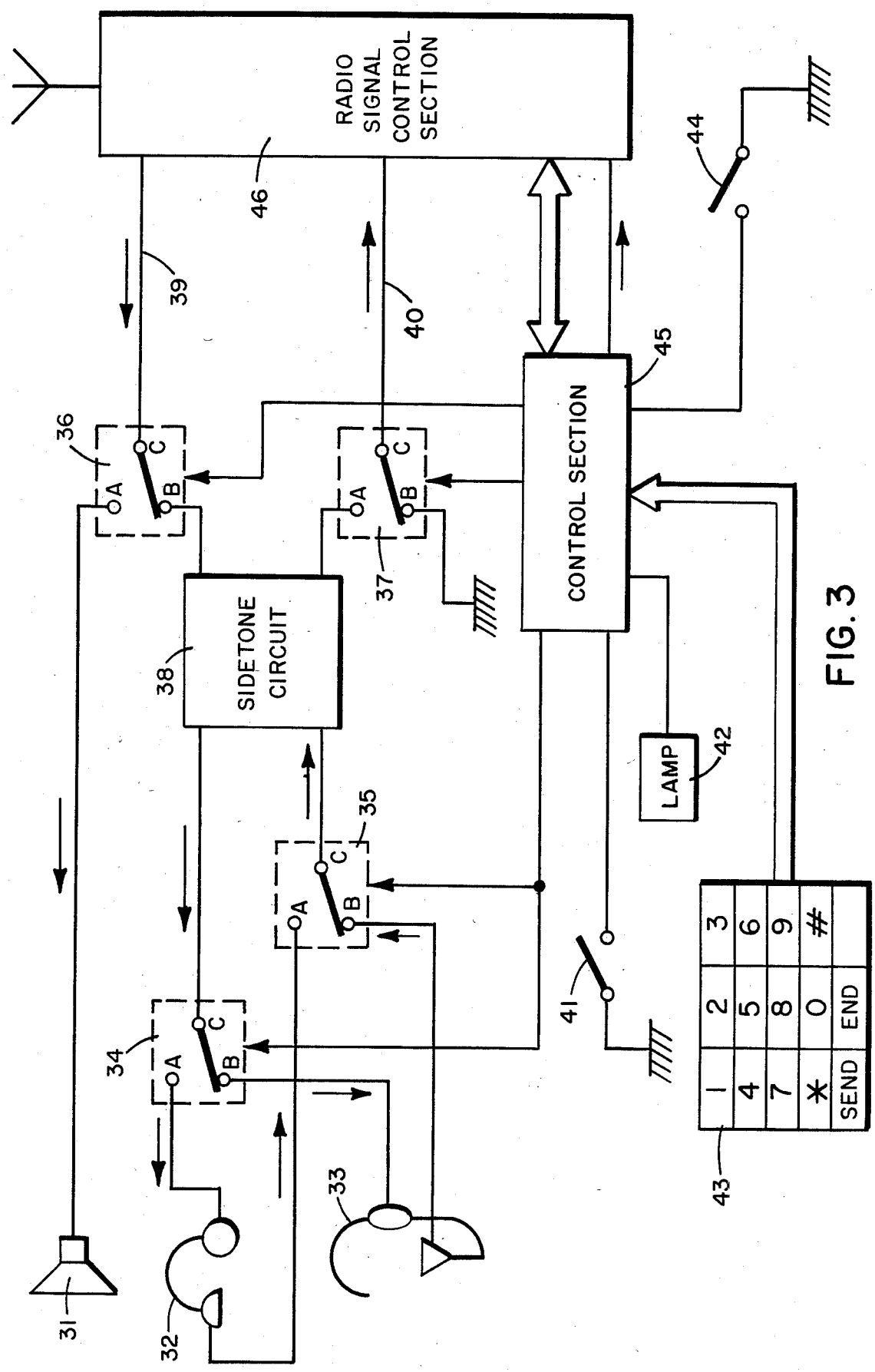
FIG. 3 is a block diagram of the first embodiment of a wireless telephone apparatus according to the present invention.

A wireless telephone apparatus according to the present invention is shown in FIG. 3. This wireless telephone apparatus includes an acoustic transmission apparatus formed by loudspeaker 31, telephone handset 32, telephone headset 33, first audio path switch 34, second audio path switch 35, third audio switch 36, mute switch 37, sidetone circuit 38, receiving line 39, transmitting line 40, headset or selector switch 41, lamp 42, control keys 43, hook switch 44 and control section 45. Conventional type radio signal control section 46 is connected to the acoustic transmission apparatus to control communication between the wireless telephone apparatus and a remote base station.

As illustrated in FIG. 3, loudspeaker 31 is connected to contact A of third audio path switch 36. The earpieces of handset 32 and headset 33 are connected to contacts A and B, respectively of first audio path switch 34 while the mouthpieces of headset 32 and headset 33 are connected to contacts A and B, respectively, second audio path switch 35. Contact C of first audio path switch 34 and second audio path switch 35, contact B of third audio path switch 36 and mute switch 37 are all connected to sidetone circuit 38. Contact B of mute switch 37 is connected to the ground terminal. Receiving line 39 is connected to contact C of third audio path switch 36 and transmitting line 40 is connected to contact C of mute switch 37.

Handset 32 and headset 33 receive audio signals from radio signal control section 46 via receiving line 39, third audio path switch 36, sidetone circuit 38 and first audio path switch 34. Audio signals are transmitted from handset 32 and headset 33 to radio signal control section 46 via second audio path switch 35, sidetone circuit 38, mute switch 37 and transmitting line 40. Handset 32 is held by the user of the wireless telephone apparatus during the normal conversation mode and headset 33 is positioned on the user's head during the hands-free conversation mode. Loudspeaker 31 receives an audio signal from radio signal control section 46 via receiving line 39 and third audio path switch 36 when an incoming call is received by the radio signal control section.

Headset or selector switch 41 enables control section 45 to connect headset 33 with receiving line 39 and transmitting line 40, instead of handset 32, via switches 34, 35, 36, 37 and sidetone circuit 38. Headset switch 41 generates a select signal which is supplied to control section 45 for selecting headset 33. Lamp 42 indicates when headset 33 is used in the hands-free conversation mode.

Figure 5:
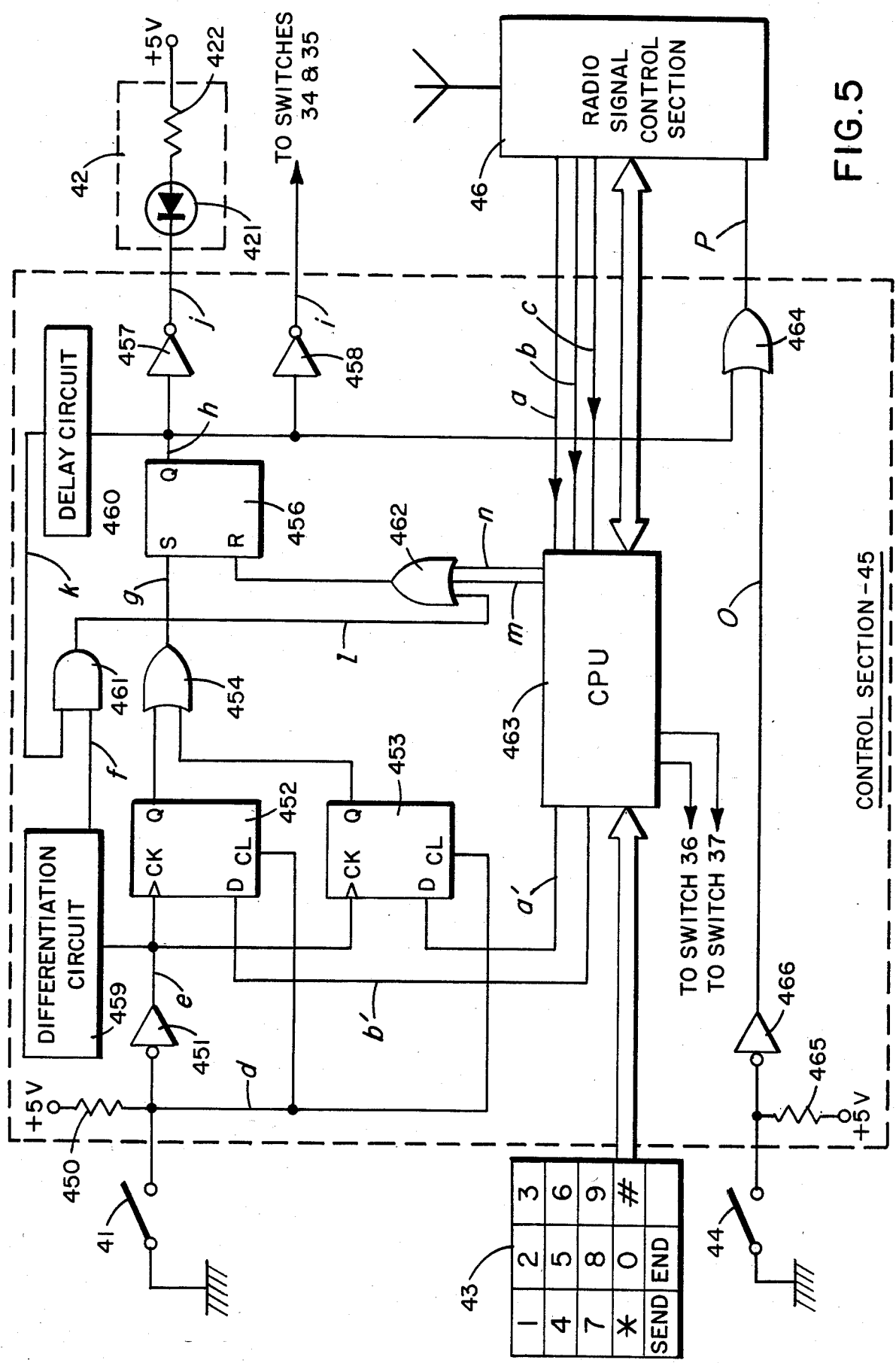
FIG. 5 is a schematic diagram of the electrical circuit for the control section of the wireless telephone apparatus of FIG. 3.
Figure 6:
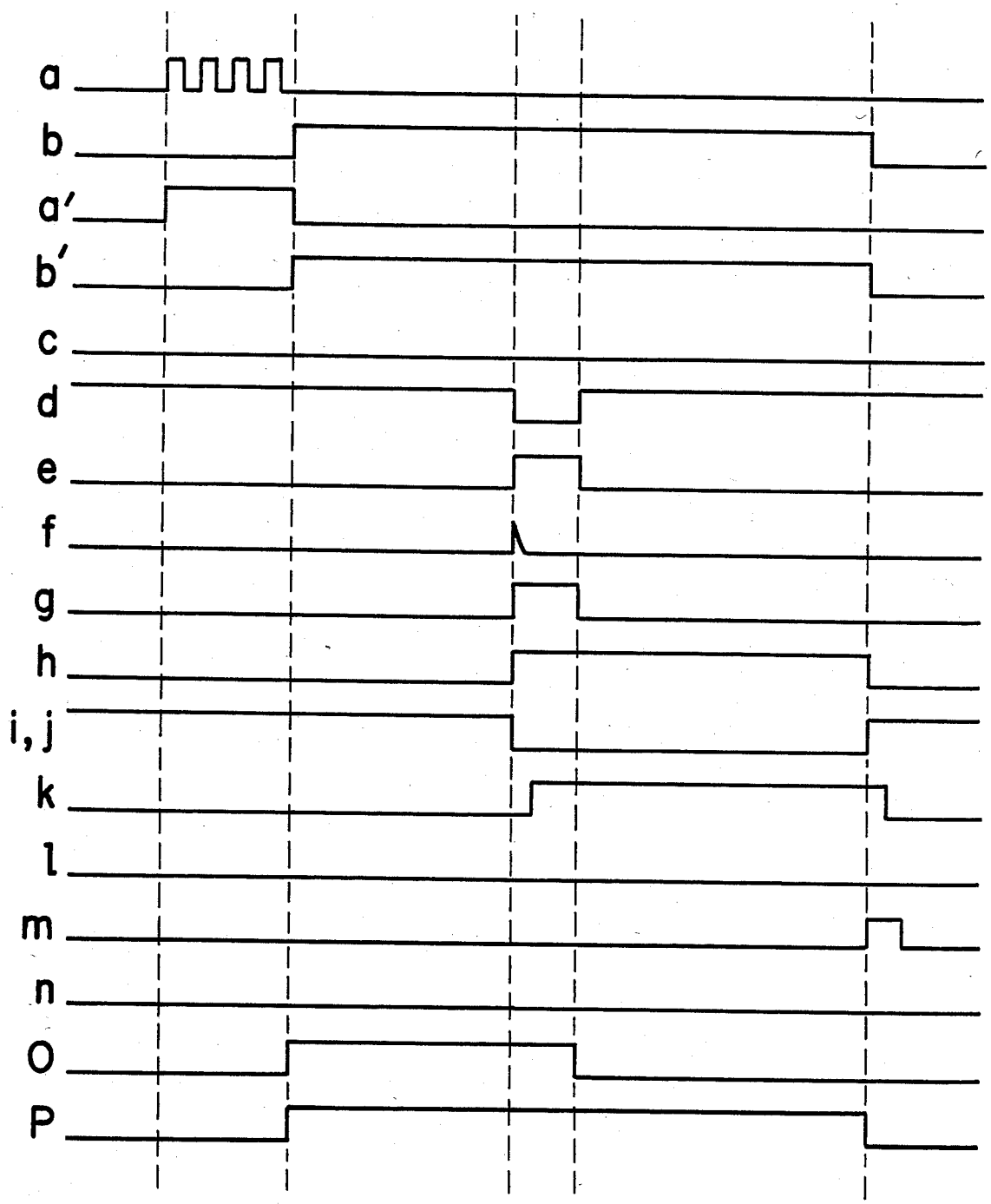
FIGS. 6-7 are timing charts showing signals in certain portions of the electrical circuit of FIG. 5.
Figure 7:
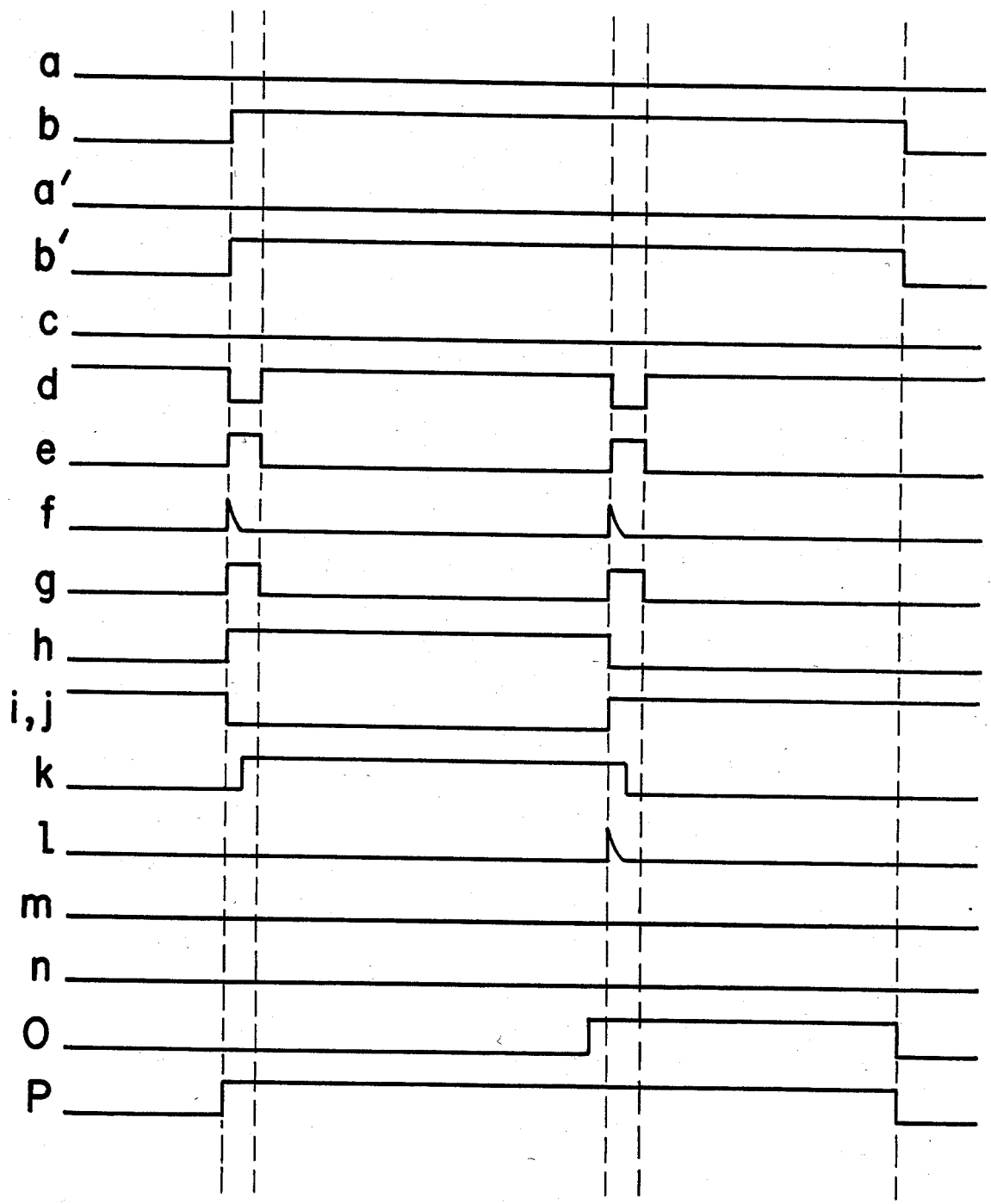

Control keys 43 include 12 dialing or digit keys, a SEND key, an END key, etc. The SEND key is used to initiate a call and the END key is used to conclude a telephone conversation. Control section 45, which is described in further detail below in connection with FIGS. 5-7, is responsive to control keys 43, headset switch 41 and hood switch 44 to control the switching operation of audio path switches 34, 35, 36 and mute switch 37. Control section 45 also is responsive to control data from radio signal control section 46 and it transmits various key data from control keys 43 and hook data (such as on-hook data and off-hook data) from hook switch 44 to radio signal control section 46.

Figure 4:
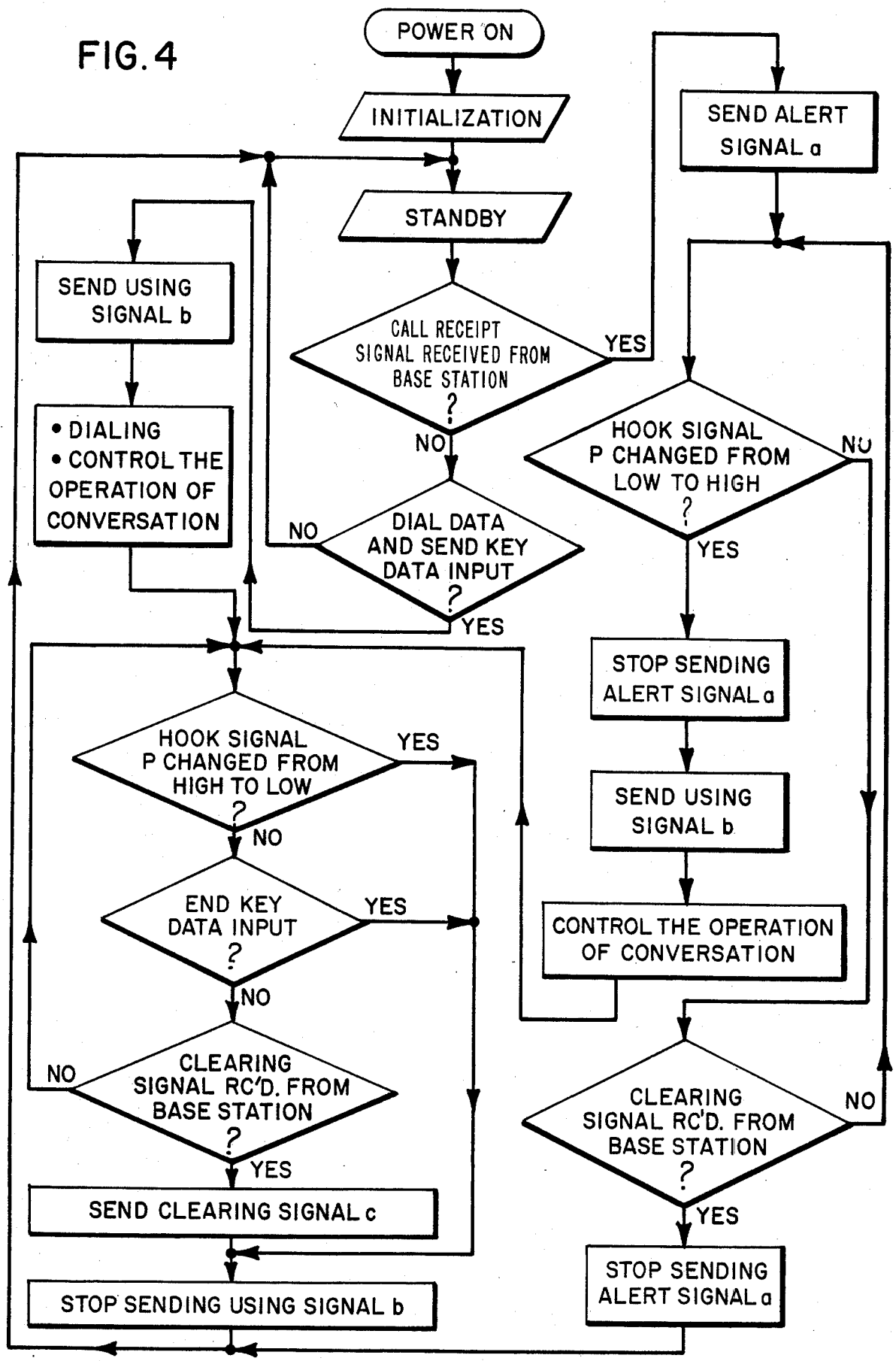
FIG. 4 is a flow chart illustrating the operation of a radio signal control section of the wireless telephone apparatus of FIG. 3.

Radio signal control section 46 receives audio signals from handset 32 or headset 33, and modulates the radio frequency signal which is transmitted to a base station. Radio signal control section 46 also receives incoming modulated radio frequency signals via an antenna and demodulates these signals to generate either a control signal or an audio signal which is sent over receiving line 39. This radio signal control section 46 also generates alert signal a, using signal b and clearing signal c in accordance with the operation described below in connection with the flow chart of FIG. 4. Upon connection of power to the wireless telephone apparatus, radio signal control section 46 performs a predetermined initialization routine which includes resetting of flags. The wireless telephone apparatus then is in a state of standby.

While in the standby state, the wireless telephone apparatus must determine when it is called by another telephone. If radio signal control section 46 receives a call receipt signal from base station 2, radio signal control section 46 generates an alert signal until hook signal p from control section 45 changes to a high signal or a clearing signal is received from base station 2. During this time, if a clearing signal is received from base station 2, wireless telephone apparatus returns to its standby state and, if hook signal changes to a high signal, using signal b is generated and alert signal a terminated to begin the telephone conversation.

Even if radio signal control section 46 does not receive a call receipt signal from base station 2, radio signal control section 46 can generate using signal b in response to dial data and SEND key data from control section 45 via the data bus. Upon generating using signal b, radio signal control section 46 transmits a call origination signal and a dialing signal to base station 2. Radio signal control section 46 then controls the operation of the telephone conversation.

If hook signal p from control section 45 changes to a low signal or END key data is received by radio signal control section 46, radio signal control section 46 stops generating using signal b and returns the wireless telephone apparatus to the standby state. If the clearing signal from base station 2 is received during a telephone conversation, radio signal control section 46 transmits clearing signal c to base station 2, stops generating using signal b and again returns the apparatus to the standby state.

If the user of the wireless telephone apparatus of the present invention initiates a call, the user first operates the 12 dialing or digit keys of control keys 43 and then operates the SEND key. Key data is received by control section 45 and transmitted to radio signal control section 46 via the data bus. In response to this key data, a call origination signal and a dialing signal are transmitted by radio signal control section 46 to base station 2 over the control channel and, according to a command signal transmitted back from base station 2, radio signal control section 46 sets the transmission frequencies to an available operating channel over which the telephone conversation takes place.

In the standby state, in response to a control signal from control section 45, first and second audio path switches 34 and 35 connect handset 32 with sidetone circuit 38, third audio path switch 36 connects loudspeaker 31 with receiving line 39 and mute switch 37 connects transmitting line 40 with the ground terminal. If an input is received from the SEND key or hook switch 44 during a time period defined by the receiving and sending of telephone calls, third audio path switch 36 and mute switch 37 connect sidetone circuit 38 with receiving line 39 and transmitting line 40 according to another control signal from control section 45. Thus, handset 32 is connected to receiving line 39 and transmitting line 40 via audio path switches 34, 35 and 36, mute switch 37 and sidetone circuit 38 when the user operates the SEND key for initiating a call. In this case, the user uses handset 32 and lamp 42 is extinguished. However, if the user operates headset switch 41 while using signal b is still being received by control section 45, headset 33 is connected to receiving line 39 and transmitting line 40 via audio path switches 34, 35, 36, mute switch 37 and sidetone circuit 38. Therefore, in the latter case, the user uses headset 33 instead of handset 32, and lamp 42 is actuated.

If the wireless telephone apparatus of the present invention is called by another telephone, base station 2 transmits the call receipt signal, together with the appropriate frequency signal for the operating channel, over the control channel. Upon receipt of these signals, radio signal control section 46 sets its output frequencies to the assigned operating channel and generates alert signal a. This alert signal a is sent to control section 45 and loudspeaker 31 via receiving line 39 and third audio path switch 36. Loudspeaker 31 rings in response to alert signal a. When the user responds to the ringing of loudspeaker 31, the user operates hook switch 44 (off-hook operation) or the SEND key in order to connect handset 32 to receiving line 39 and transmitting line 40 via audio path switches 34, 35, 36, mute switch 37 and sidetone circuit 38. In this case, the user uses handset 32 and lamp 42 is extinguished. If the user operates headset switch 41 while alert signal a is received by control signal 45 and loudspeaker 31, headset 33 is connected to receiving line 39 and transmitting line 40 via audio path switches 34, 35, 36, mute switch 37 and sidetone circuit 38. Therefore, in the latter case, the user uses headset 33.

During a telephone conversation, the user can operate headset switch 41 to switch from using handset 32 to headset 33. Headset 33 is connected to receiving line 39 and transmitting line 40 in accordance with a control signal from control section 45 to enable the user to use headset 33. If the user operates headset switch 41 while using headset 33, as soon as hook switch 44 (off-hook operation) is operated, handset 32 is connected to receiving line 39 and transmitting line 40 in accordance with another control signal from control section 45.

FIG. 5 illustrates in greater detail one embodiment of control section 45 of the present invention. Lamp 42 includes luminous diode 421 and resistance 422. Control section 45 includes resistances 450, 465, inverters 451, 457, 458, 466, AND gate 461, OR gates 454, 462, 464, D-type flip-flops (D-F/F) 452, 453, S-R-type flip-flop (SR-F/F) 456, differentiation circuit 459, delay circuit 460 and CPU 463. FIGS. 6–7 show signals generated in certain portions of the circuit of FIG. 5. FIG. 6 shows the signals generated when receiving a telephone call and FIG. 7 shows the signals generated when sending a telephone call. The sequence of operations is described below in connection with FIGS. 6-7.

CPU 463 generates alert signal a' and using signal b' in accordance with alert signal a and using signal b from radio signal control section 46. In the case of receiving a telephone call, CPU 463 receives alert signal a, generates high level alert signal a' and supplies alert signal a' to terminal D of D-type flip-flop 453. At the same time, low level using signal b' is supplied to terminal D of D-type flip-flop 452. If the user lifts handset 32, hook switch 44, is closed which causes inverter 466 and OR gate 464 to output high signal O, P. Radio signal control section 46 stops sending alert signal a and begins sending using signal b as soon as it receives high signal P (off-hook signal). Radio signal control section 46 then supplies control data to CPU 463 which is used to connect sidetone circuit 38 with receiving line 39 and transmitting line 40. When CPU 463 receives this control data, CPU 463 generates a control signal which connects sidetone circuit 38 to receiving line 39 and transmitting line 40 via third audio path switch 36 and mute switch 37. When CPU 463 receives using signal b, it generates high level using signal b' and supplies this signal to terminal D of D-type flip-flop 452. At the same time, low level alert signal a' is supplied to terminal D of D-type flip-flop 453.

If the user operates headset switch 41 (which is a momentary contact switch) during use of handset 32, input signal d of inverter 451 changes to a low signal and inverter 451 temporarily outputs high signal e. High signal e is supplied to clock terminal of D-type flip-flop 452, 453. Flip-flop 452 and OR gate 454 temporarily output high signal g which is supplied to terminal S of SR-flip-flop 456, which in turn outputs high signal h. At this time, inverter 458 outputs low level control signal i which connects headset 33 to sidetone circuit 38, inverter 457 outputs low level signal j which actuates luminous diode 421 and OR gate 464 outputs high signal p (off-hook signal).

If the user operates the END key of control keys 43 while using headset 33, CPU 463 sends narrow pulse m to OR gate 462 which is connected to the reset terminal of SR-flip-flop 456. This resets SR-flip-flop 456, which then outputs low level signal h. At this time, inverter 458 outputs high level control signal i which connects handset 32 to sidetone circuit 38, inverter 457 outputs high signal j which extinguishes luminous diode 421 and OR gate 464 outputs low signal p (on-hook signal). Radio signal control section 46 stops sending using signal b as soon as it receives low signal p (on-hook signal). Radio signal control section 46 then sends control data to CPU 463. CPU 463 uses this control data to generate a control signal which connects loudspeaker 31 to receiving line 39 and connects the ground terminal to transmitting line 40 via audio path switch 36 and mute switch 37.

In the case of sending a telephone call, CPU 463 receives using signal b, generates high level using signal b' and supplies using signal b' to terminal D of D-type flip-flop 452. At the same time, low level alert signal a' is supplied to terminal D of D-type flip-flip 453. If the user closes headset switch 41, luminous diode 421 is actuated, OR gate 464 outputs high signal p (off-hook signal) and headset 33 is connected to sidetone circuit 38 by audio path switches 34 and 35.

If the user operates headset switch 41 again while using headset 33, as soon as hook switch 44 (off-hook operation) is operated, OR gate 454 outputs high signal g. However, at this time, high signal e is supplied to differentiation circuit 459. Differentiation circuit 459 outputs narrow pulse f and delay circuit 460 outputs high signal k. Because AND gate 461 and OR gate 462 output a narrow pulse l which is supplied to the reset terminal of SR-flip-flop 456, SR-flip-flop 456 is reset and outputs low signal h. Inverter 458 then outputs high level control signal i which connects handset 32 with sidetone circuit 38 via audio path switches 34 and 35 and inverter 457 outputs high signal j which extinguishes luminous diode 421. Hook switch 44 now is closed and high signal p (off-hook signal) is generated so that the user is able to use handset 32 instead of headset 33.

If the user puts handset 32 down, which opens hook switch 44, OR gate 464 outputs low signal p (on-hook signal). Radio signal control section 46 stops sending using signal b as soon as it receives low signal p. Radio signal control section 46 then sends control data to CPU 463. CPU 463 uses this control data to generate a control signal which connects loudspeaker 31 to receiving line 39 and connects the ground terminal to transmitting line 40.

If CPU 463 receives clearing signal c from radio signal control section 46, CPU 463 generates narrow pulse n which resets SR-flip-flop 456. CPU 463 then connects loudspeaker 31 to receiving line 39 and connects ground terminal to transmitting line 40. This terminates the telephone conversation.

Figure 8:
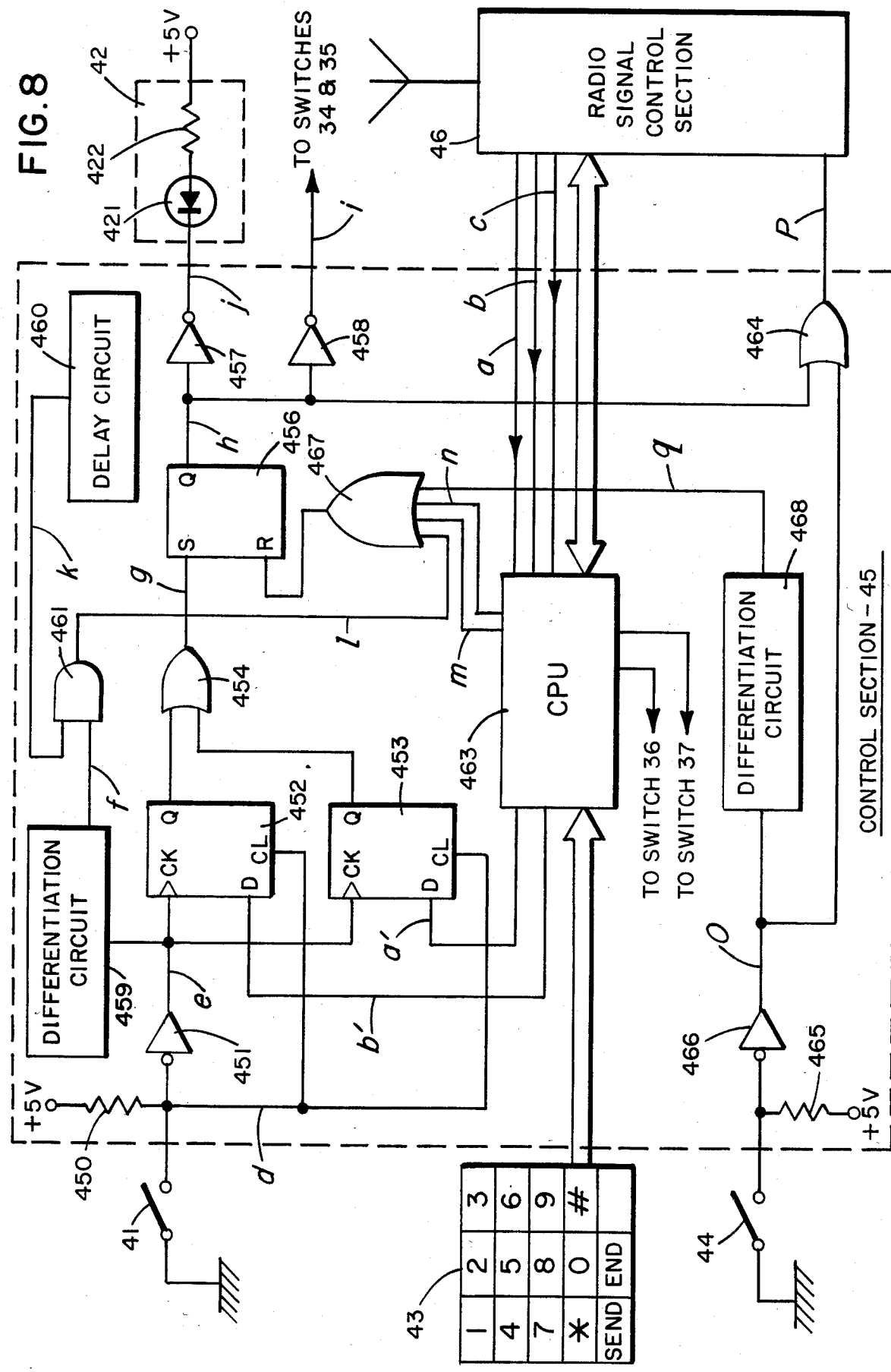
FIG. 8 is a schematic diagram of the electrical circuit for a second embodiment of the wireless telephone apparatus of the present invention.

FIG. 8 illustrates another embodiment of control section 45 of the present invention. The difference between FIGS. 5 and 8 is the addition of differentiation circuit 468 and OR gate 467 to the circuit of FIG. 8. Differentiation circuit 468 receives signal o from hook switch 44 and generates narrow pulse signal q when signal o is high. Narrow pulse signal q is supplied to SR-flip-flop 456 via OR gate 467 to reset SR-flip-flop 456. If the user lifts handset 32 while using headset 33, differentiation circuit 468 generates narrow pulse signal q to reset SR-flip-flop 456. Output signal h of SR-flip-flop 456 then changes to a low signal, and inverters 457 and 458 output high signals j and i. At the same time, OR gate 464 outputs high signal p (off-hook signal). Thus, the user can switch to handset 32 because sidetone circuit 38 is connected with handset 32 instead of headset 33 in response to high level control signal i. In control section 45 of FIG. 8, the user can switch from headset 33 to handset 32 by lifting handset 32 while using headset 33.

Figure 9A:
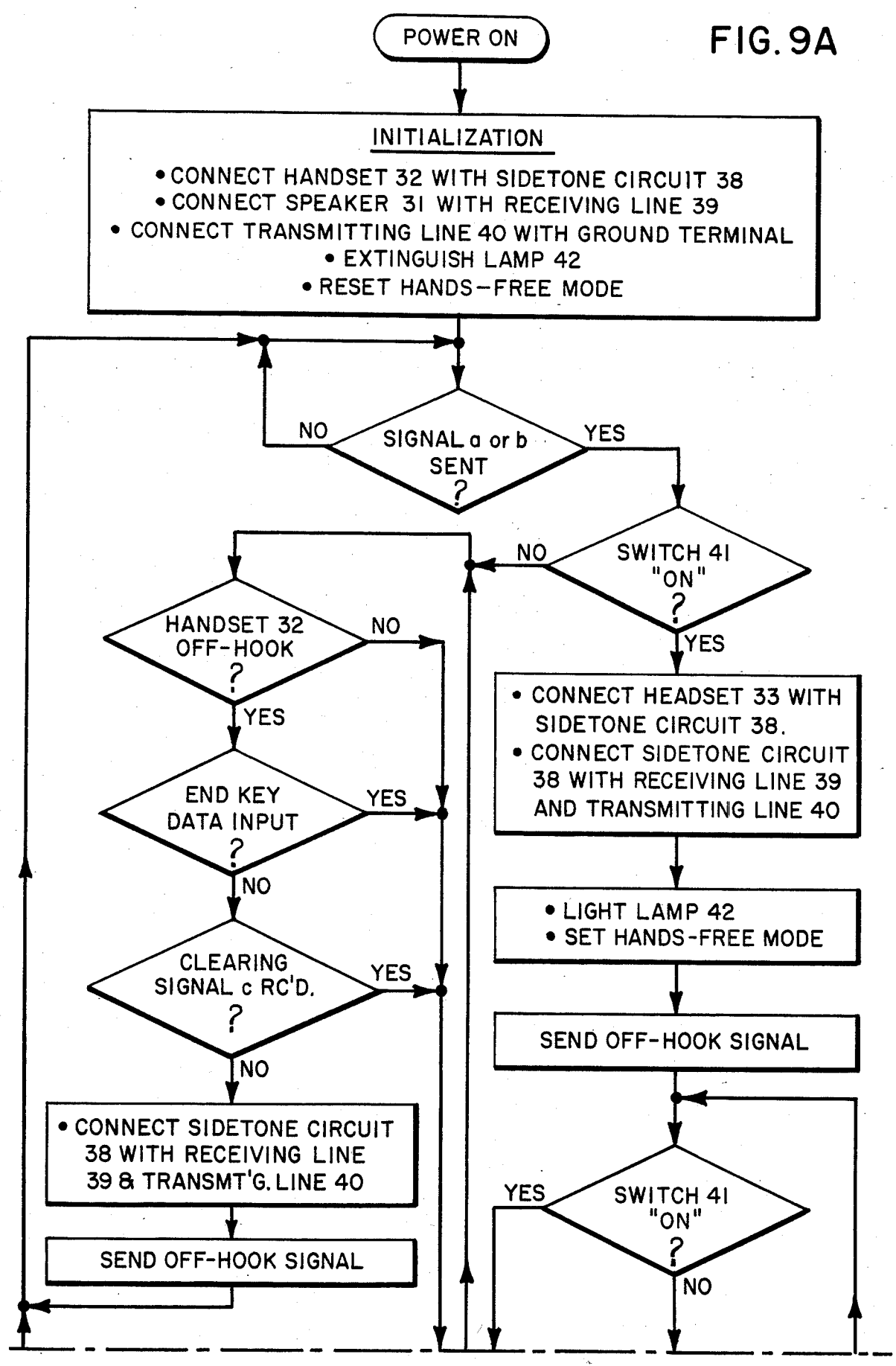
FIGS. 9A and 9B are a flow chart illustrating the operation of a third embodiment of the control section of the wireless telephone apparatus of the present invention.
Figure 9B:
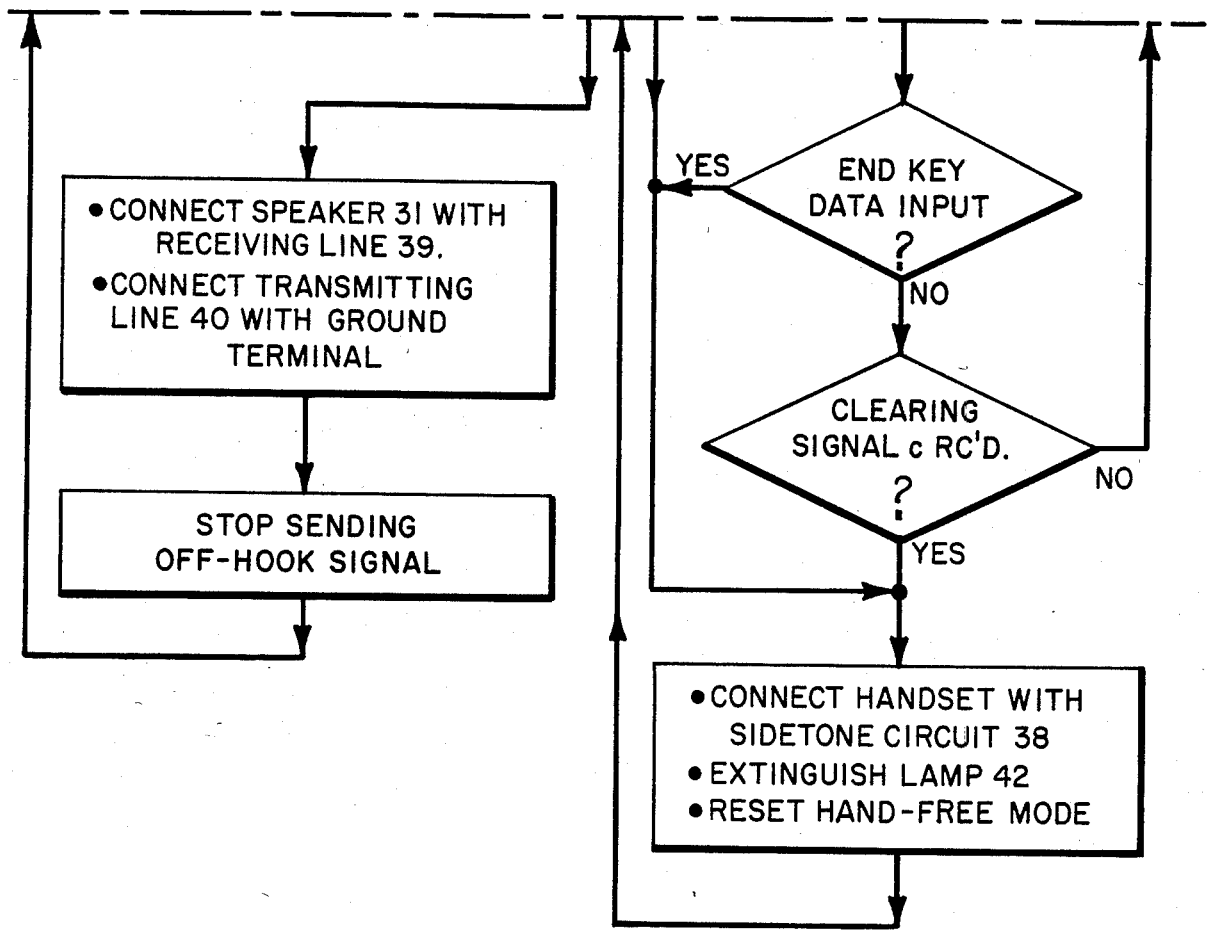

FIG. 9 is a flow chart illustrating the operation of another embodiment of control section 45 in which the discrete elements of the control section of FIG. 5 are eliminated in favor of a software system. Upon connection of power, control section 45 executes a predetermined initialization routine which generates control signals to connect handset 32 to sidetone circuit 38, connect speaker 31 to receiving line 39, connect transmitting line 40 to the ground terminal, extinguish lamp 42 and resets the system for operation in a hands-free mode.

The next step is to determine whether either alert signal a or using signal b has been sent to control section 45. If using signal b has been sent from radio signal control section 46 and this signal is not accepted (switch 41 is not on), control section 45 then determines the state of hook switch 44 by determining whether handset 32 is off-hook. If the state of hook switch 44 has changed to an off-hook condition, control section 45 generates a control signal which connects sidetone circuit 38 to receiving line 39 and transmitting line 40. In the off-hook condition, a check is also made to determine whether data from the END key has been inputted and whether clearing signal c has been received from radio signal control section 46. If not, then sidetone circuit 38 is connected to receiving line 39 and transmitting line 40, the off-hook signal is sent to radio signal control section 46, and the step of determining whether signal a or b is sent is performed again. In the on-hook condition, speaker 31 is connected to receiving line 39 and the step of determining whether signal a or b has been sent is performed again.

If signal a or b has been sent, control section 45 first reads the condition of headset switch 41. If this switch is on, control section 45 generates control signals which connect headset 33 to sidetone circuit 38 and connects sidetone circuit 38 to receiving line 39 and transmitting line 40. Control section 45 also lights lamp 42, sets up a hands-free conversation mode and sends an off-hook signal to radio signal control section 46. After control section 45 performs the above operations, if headset switch 41 is operated, or END key data is inputted, or clearing signal c is received from radio signal control section 46, then control section 45 generates a control signal which connects handset 32 to sidetone circuit 38. Control section 45 also extinguishes lamp 42 and resets the apparatus to a hands-free conversation mode. A check is then made to determine whether handset 32 is off-hook.

Although illustrative embodiments of the present invention have been described in detail with reference to the accompanying drawings, it is to be understood that the invention is not limited to those precise embodiments. Various changes and modifications may be effected therein by one skilled in the art without departing from the scope or spirit of the invention.

We claim:

1. In a wireless telephone apparatus capable of sending outgoing telephone calls and receiving incoming telephone calls, said wireless telephone apparatus including radio signal control means for communicating with a remote base station by transmitting radio signals and acoustic transmission means connected to said radio signal control means for generating and receiving audio signals, said acoustic transmission means comprising:
   a telephone handset;
   a telephone headset;
   a ringing device;
   transmitting and receiving lines connecting said acoustic transmission means to said radio signal control means;
   headset switch means operable by the user of said wireless telephone apparatus for generating a select signal to select said telephone headset;
   control means connected to said headset switch means for generating a first control signal to interconnect said telephone headset when said headset switch means generates a select signal and a second control signal to interconnect said telephone handset when no select signal is generated;
   first switching means responsive to the first control signal for connecting said telephone headset to said transmitting and receiving lines and responsive to the second control signal for connecting said telephone handset to said transmitting and receiving lines; and
   second switching means for connecting said ringing device to said receiving line;
   said second switching means being responsive to said control means to actuate said second switching means when said wireless telephone apparatus is in either a standby condition or receiving an unanswered call.

2. The wireless telephone apparatus of claim 1 wherein said control means only generates the first control signal to interconnect said telephone headset during a time period defined by the beginning and end of a telephone call, including ringing time.

3. The wireless telephone apparatus of claim 1 wherein said control means further generates an off-hook data signal for enabling said wireless telephone apparatus to continue a telephone conversation whenever said headset switch means is generating the select signal indicating said telephone headset is being used.

4. The wireless telephone apparatus of claim 1 wherein after the first control signal is generated by said control means and during operation of said telephone headset, said control means is responsive to a further actuation of said headset switch means by the user to generate the second control signal to enable the user to use said telephone handset without interrupting the telephone conversation.

5. The wireless telephone apparatus of claim 1 wherein said acoustic transmission means further comprises handset switch means for generating an off-hook signal when the user uses said telephone handset, said control means being responsive to the off-hook signal after the first control signal is generated by said control means, and during operation of said telephone headset, to generate the second control signal to enable the user to use said telephone handset without interrupting the telephone converstaion.

6. The wireless telephone apparatus of claim 1 wherein said acoustic transmission means further comprises handset switch means for generating an off-hook signal when the user uses said telephone handset, said control means being responsive to said handset switch means and said headset switch means to generate an off-hook signal whenever either said telephone handset or said telephone headset is being used.

7. The wireless telephone apparatus of claim 1 wherein said second switching means further connects said transmitting line to ground .

8. The wireless telephone apparatus of claim 1 wherein said acoustic transmission means further comprises display means connected to said control means and responsive to the first control signal for indicating when said telephone headset is being used.

9. The wireless telephone apparatus of claim 1 wherein after the first control signal is generated by said control means and during operation of said telephone headset, said control means is responsive to either the end of a telephone call or the arrival of an incoming call to generate the second control signal.

* * * * *